United States Patent Office 3,020,283
Patented Feb. 6, 1962

3,020,283
BIS-LEPIDINES
Richard U. Schock, Jr., and Richard B. Hasbrouck, Lake Forest, Ill., and Donald E. Dickson, Kenosha, Wis., assignors to Abbott Laboratories, Chicago, Ill., a corporation of Illinois
No Drawing. Filed Oct. 20, 1958, Ser. No. 768,064
12 Claims. (Cl. 260—288)

The present invention is concerned with novel bis-lepidines represented by the formula:

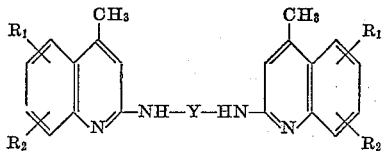

and non-toxic salts thereof. In this and succeeding formulas, Y represents an alkylene group having from 2 to 12 carbon atoms inclusive, phenylene, cyclohexyl, 1,4-xylyl or 1,4-phenylenebisethylene and each $R_1$ and $R_2$ represents hydrogen, lower alkyl, lower alkoxy, hydroxy, chlorine or bromine. The terms "lower alkyl" and "lower alkoxy" refer to the alkyl and alkoxy radicals containing from 1 to 5 carbon atoms, inclusive. These compounds may be conveniently isolated as dihydrochlorides which salts are crystalline solids slightly soluble in water. If desired, the bases may be readily obtained by the addition of ammonium hydroxide to a warm solution of the dihydrochloride. The term "non-toxic salts" as employed herein refers to acid addition salts of the above bases such as the hydrochlorides, sulfates, stearates, citrates, lactates, aminobenzoates and the like, as well as the quaternary ammonium salts of said bases wherein quaternization occurs on a nuclear nitrogen atom in the lepidine nucleus. Such quaternary ammonium salts include the methosulfates, methiodides, methochlorides, loweralkyl propionates, p-toluenesulfonates, loweralkyl benzoates and the like. The bases, and more particularly their non-toxic salts, are useful as anthelmintics for the control of pinworms and tapeworms in mice, dogs and higher mammals.

The new compounds may be prepared by the reaction of a diamine represented by the formula $H_2N-Y-NH_2$ with a 2-chlorolepidine represented by the formula:

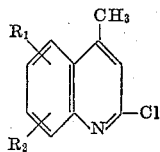

The reaction, which is sometimes exothermic, takes place smoothly in the presence of phenol at the temperature range of from about 125° C. to 175° C. with the formation of the desired product as the dihydrochloride. The temperature may be controlled by external heating or cooling as may be required. Good results are obtained when at least two molecular proportions of the 2-chlorolepidine compound is reacted with one molecular proportion of diamine.

In carrying out the reaction, the reactants are mixed with a quantity of phenol and the resulting mixture heated at a temperature of from about 125° C. to 175° C. with external cooling if necessary to control the reaction. Upon completion of the reaction, the reaction mixture is cooled and poured into a suitable, inert, organic solvent such as acetone. The desired bis-lepidine product may then be isolated by conventional means as the dihydrochloride. The crystalline dihydrochloride which precipitates is removed by filtration, washed with water and recrystallized from boiling water.

The quaternary ammonium salts of the present invention may be prepared by conventional means known to those skilled in the art, as for example, heating the base with a quaternizing agent such as an alkylsulfate, loweralkyl halide or other suitable agent.

The following examples illustrate the invention, but are not to be construed as a limitation thereof.

EXAMPLE I

N,N'-bis-(2-lepidyl)-1,6-diaminohexane dihydrochloride

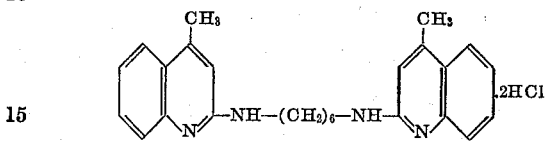

A mixture of 35 grams (0.197 mole) of 2-chlorolepidine, 11.5 grams (0.098 mole) of 72% 1,6-diaminohexane and 23.4 grams of phenol was heated slowly to 150° C. at which point the reaction became exothermic and the temperature increased rapidly to 260° C. The reaction mixture was then allowed to cool to 60° C. and poured into 400 milliliters of acetone with constant stirring. Two milliliters of concentrated hydrochloric acid was thereafter added to the acetone mixture which was cooled with ice. The precipitate which formed was separated by filtration, washed successively with water and acetone and recrystallized from boiling water. As a result of these operations, there was obtained an N,N'-bis-(2-lepidyl)-1,6-diaminohexane dihydrochloride as a white, crystalline solid which melted at 278–282° C.

Analysis.—Calcd. for $C_{26}H_{30}N_4 \cdot 2HCl \cdot 4H_2O$: C=57.45%; H=7.42%; N=10.31%. Found: C=56.93%; H=7.42%; N=10.32%.

The quaternary ammonium methiodide salt of the foregoing compound was prepared by suspending 9.5 grams of N,N'-bis-(2-lepidyl)-1,6-diaminohexane in 100 ml. of dry toluene and 50 ml. of nitrobenzene and heating the resulting mixture at the boiling temperature and under reflux. Dimethylsulfate (6.5 ml.) was thereafter added portionwise with stirring over a period of one hour. The reaction mixture was then cooled and poured into 200 ml. of acetone. The crude dimethosulfate salt which precipitated was dissolved in 100 ml. of hot water and 15 grams of sodium iodide added to the resulting solution. The N,N'-bis-(2 - lepidyl)-1,6-diaminobenzene dimethiodide which precipitated was removed by filtration and recrystallized from water.

Analysis.— Calculated for $C_{28}H_{36}N_4I_2 \cdot H_2O$: C=48.01%; H=5.47%; N=8.00%. Found: C=48.09%; H=5.60%; N=8.88%.

EXAMPLE II

N,N'-bis-(6-methoxy-2-lepidyl)-1,6-diaminohexane dihydrochloride

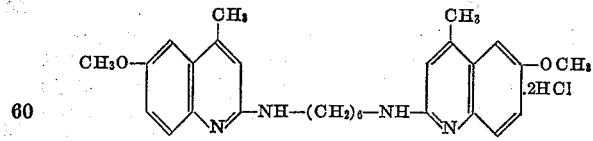

A mixture of 31.9 grams (0.152 mole) of 2-chloro-6-methoxylepidine; 12.3 grams (0.076 mole) of 72% 1,6-diaminohexane and 40 grams of phenol was heated at a temperature of 165° C. for a period of 6 hours. The reaction mixture was then poured into acetone and processed as described in Example I to obtain the N,N'-bis-(6-methoxy-2-lepidyl)-1,6-diaminohexane dihydrochloride as a crystalline solid which melted at 282–286° C.

Analysis. — calcd. for $C_{28}H_{34}N_4O_2 \cdot 2HCl \cdot 2.5H_2O$: C=58.20%; H=7.15%; N=9.70%. Found: C=58.20%; H=6.61%; N=9.76%.

EXAMPLE III

N,N' - bis - (6,8-dimethyl-2-lepidyl)-1,6-diaminohexane dihydrochloride

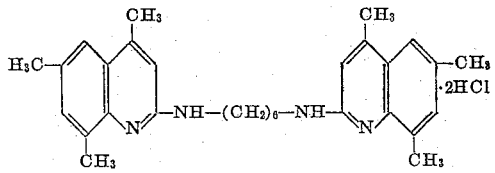

A mixture of 23.0 grams (0.112 mole) of 2-chloro-6,8-dimethyllepidine, 9.1 grams (0.056 mole) of 72% 1,6-diaminohexane and 30 grams of phenol was heated at a temperature of 165° C. for a period of 6 hours. The reaction mixture was thereafter poured into acetone and processed as in Example I to obtain the above named dihydrochloride as a white solid melting at 336–338° C.

Analysis.—calcd. for $C_{30}H_{38}N_4 \cdot 2HCl \cdot 0.5H_2O$: C=67.10%; H=7.70%; N=10.40%. Found: C=67.10%; H=7.38%; N=10.60%.

EXAMPLE IV

N,N' - bis - (8-methyl-2-lepidyl)-1,6-diaminohexane dihydrochloride

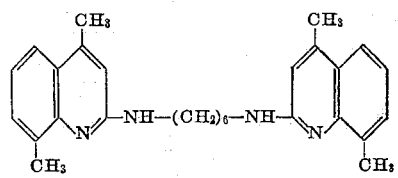

This compound was prepared by heating a mixture of 19 grams (0.10 mole) of 2-chloro-8-methyllepidine, 8.05 grams (0.05 mole) of 72% 1,6-diaminohexane and 30 grams of phenol at 175° C. for about 6 hours. Upon completion of the reaction, the reaction mixture was processed as previously described to obtain the above named dihydrochloride which melted at 297–300° C.

Analysis.—calcd. for $C_{28}H_{34}N_4 \cdot 2HCl \cdot 0.5H_2O$: C=66.20%; H=7.32%; N=11.00%. Found: C=66.70%; H=7.54%; N=11.20%.

EXAMPLE V

In a manner similar to that described in the foregoing examples, other bis-lepidines were prepared and characterized by the reaction of the appropriate 2-chlorolepidines and diamines. In the table which follows, specific radicals are substituted for Y, $R_1$ and $R_2$ in the following generic formula:

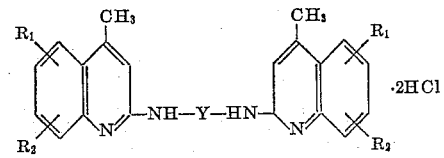

Thus, N,N'-bis-(2-lepidyl)-1,2-diaminoethane wherein Y is $(CH_2)_2$ and each $R_1$ and $R_2$ are hydrogen may be prepared by the reaction of 2-chlorolepidine and ethylenediamine.

| Y | $R_1$ | $R_2$ | Moles Water of Hydration | M.P. °C. | Calculated | | | Found | | |
|---|---|---|---|---|---|---|---|---|---|---|
| | | | | | Percent C | Percent H | Percent N | Percent C | Percent H | Percent N |
| $(CH_2)_2$ | H | H | 2.0 | 321–323 | 58.54 | 6.26 | 12.41 | 58.68 | 6.30 | 12.63 |
| $(CH_2)_3$ | H | H | 3.0 | 249.5–250.5 | 57.25 | 6.68 | 11.52 | 57.56 | 6.78 | 11.65 |
| $(CH_2)_4$ | H | H | 0.75 | 268–269 | 63.09 | 6.51 | 12.26 | 63.23 | 6.77 | 12.48 |
| $(CH_2)_5$ | H | H | 1.75 | 154–155.5 | 61.40 | 6.90 | 11.48 | 61.68 | 7.08 | 12.06 |
| p-Phenylene | H | H | 4.0 | 345 | 58.31 | 6.02 | 10.47 | 57.99 | 6.05 | 10.83 |
| 1,4-Cyclohexyl | H | H | 3.5 | 324–326 | 58.86 | 6.65 | 10.56 | 59.05 | 7.25 | 10.39 |
| $(CH_2)_7$ | H | H | 0.25 | 270–274 | 66.18 | 7.09 | 11.44 | 66.11 | 6.98 | 11.40 |
| $(CH_2)_8$ | H | H | 2.0 | 176–178 | 62.70 | 7.50 | 10.47 | 62.34 | 7.56 | 10.12 |
| 1,4-xylyl | H | H | 3.25 | 317 | 61.14 | 6.33 | 10.18 | 60.93 | 6.50 | 10.47 |
| $(CH_2)_9$ | H | H | 0.5 | 93–95 | 66.66 | 7.52 | 10.72 | 67.07 | 7.23 | 10.60 |
| $(CH_2)_{10}$ | H | H | 0 | 157–158 | 68.30 | 7.63 | 10.62 | 67.91 | 7.54 | 10.31 |
| —CH$_2$CH$_2$⟨⟩CH$_2$CH$_2$— | H | H | 0 | 320–325 | 69.36 | 6.21 | | 69.13 | 6.10 | |
| $(CH_2)_{11}$ | H | H | 2.0 | 132 | 64.46 | 8.03 | 9.70 | 64.70 | 8.03 | 9.29 |
| $(CH_2)_{12}$ | H | H | 2.25 | 210 | 64.47 | 8.20 | 9.40 | 64.50 | 8.18 | 9.18 |
| $(CH_2)_6$ | 6-CH$_3$ | H | 1.5 | 285–288 | 63.80 | 7.45 | 10.60 | 63.70 | 7.28 | 10.80 |
| $(CH_2)_6$ | 7-CH$_3$ | H | 0.5 | 346–349 | 66.13 | 7.34 | | 66.70 | 7.63 | |
| $(CH_2)_6$ | H | 8-C$_2$H$_5$ | 0 | 298.5–299.5 | 68.29 | 7.65 | 10.62 | 68.12 | 7.61 | 10.70 |
| $(CH_2)_6$ | 6-OH | H | 0 | 260 | 62.03 | 6.41 | | 62.05 | 6.57 | |
| $(CH_2)_6$ | 5-OCH$_3$ | 8-OCH$_3$ | 1.25 | 238.5–239.5 | 58.67 | 6.99 | 9.11 | 58.39 | 7.25 | 8.89 |
| $(CH_2)_6$ | 6-OC$_5$H$_{11}$ | H | 0 | 248.5–249.5 | 67.18 | 8.15 | 8.70 | 66.93 | 8.03 | 8.87 |
| $(CH_2)_6$ | H | 7-Cl | 0 | 136–138 (Base) | 66.80 | 6.04 | | 66.74 | 6.13 | |
| $(CH_2)_6$ | 5-Cl | 8-CH$_3$ | 0 | 279–281 | 59.36 | 5.94 | 10.06 | 59.16 | 6.03 | 9.86 |

In a similar manner to that described in the foregoing examples, other bis-lepidines may be prepared of which the following are representative:

N,N' - bis - (6-bromo-2-lepidyl)-1,6- diaminohexane dihydrochloride by the reaction of 2-chloro-6-bromolepidine and 1,6-diaminohexane.

N,N'-bis-(8-ethoxy-2-lepidyl)-1,2-diaminoethane dihydrochloride by the reaction of 2-chloro-8-ethoxylepidine and ethylenediamine.

N,N' - bis - (7-propoxy-2-lepidyl)-1,4-diaminobutane dihydrochloride by the reaction of 2-chloro-7-propoxylepidine and 1,4-diaminobutane.

N,N'-bis-(6,8-dibutyl-2-lepidyl)-1,3-diaminopropane dihydrochloride by the reaction of 2-chloro-6,8-dibutyllepidine and 1,3-diaminopropane.

N,N'-bis-(8-propyl-2-lepidyl)-1,7-diaminoheptane dihydrochloride by the reaction of 2-chloro-8-propyllepidine and 1,7-diaminoheptane.

N,N'-bis-(5,7-diethyl-2-lepidyl)-1,9-diaminononane dihydrochloride by the reaction of 2-chloro-5,7-diethyllepidine and 1,9 diaminononane.

N,N'-bis-(7-butoxy-2-lepidyl)-1,8-diaminooctane dihydrochloride by the reaction of 2-chloro-7-butoxylepidine and 1,8-diaminooctane.

N,N' - bis-(6,8 - dibromo-2-lepidyl)-1,12 - diaminododecane dihydrochloride by the reaction of 2-chloro-6,8-dibromolepidine and 1,12-diaminododecane.

N,N'-bis-(6 - amyl-2-lepidyl)-1,10-diaminodecane dihydrochloride by the reaction of 2-chloro-6-amyllepidine and 1,10-diaminodecane.

The 2-chlorolepidines employed as one of the starting materials as herein described are, in general, known compounds. Others may be prepared by methods in themselves known. The general method of preparation is illustrated by the following series of reactions:

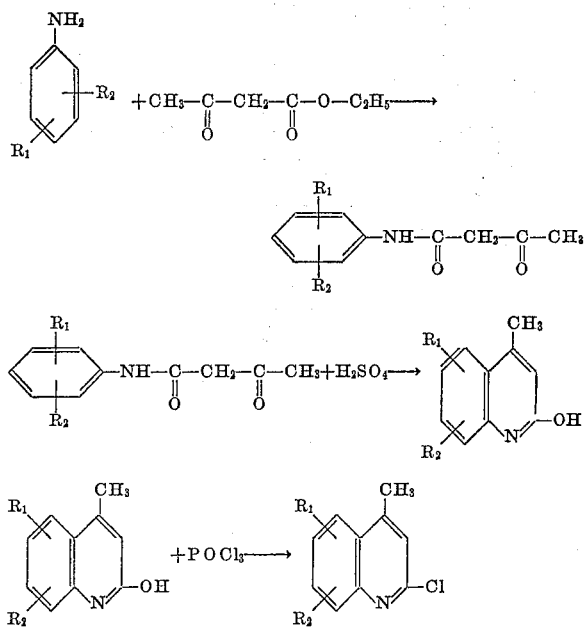

Thus, aniline or one of its ring-substituted derivatives is condensed with ethyl acetoacetate by the method of Campbell et al., J. Org. Chem., 11, 805 (1946) to form the corresponding acetoacetanilide which is cyclized with sulfuric acid by the method of Kaslow and Sommer, J. Am. Chem. Soc. 68, 645 (1946), to form a 2-hydroxy-lepidine. The latter is converted to the 2-chlorolepidine by treatment with phosphorus oxychloride using the method of Kaslow and Sommer cited above. The melting points of some of the 2-chlorolepidines employed in the present invention are tabulated below wherein $R_1$ and $R_2$ are substituted by specific radicals and in the positions designated in the generic formula

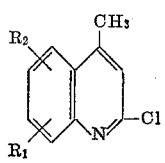

| $R_1$ | $R_2$ | Melting Point, °C. |
|---|---|---|
| H | H | 58.5 |
| 6-$CH_3$ | H | 96 |
| H | 7-$CH_3$ | 49 |
| H | 8-$CH_3$ | 60 |
| 6-$CH_3$ | 8-$CH_3$ | 129 |
| H | 8-$C_2H_5$ | 52.5 |
| 6-$OCH_3$ | H | 143 |
| 5-$OCH_3$ | 8-$OCH_3$ | 116 |
| 6-$OC_5H_{11}$ | H | 76 |
| H | 7-Cl | 98 |
| 5-Cl | 8-$CH_3$ | 74 |

The diamines, $H_2N$—Y—$NH_2$, also employed as starting materials in the present invention wherein Y is phenylene or $(CH_2)_2$ through $(CH_2)_6$ are all commercially available. The diamines in which Y is $(CH_2)_7$ through $(CH_2)_{12}$,

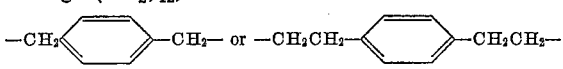

are known compounds and were prepared by known methods by catalytic reduction of the corresponding dinitriles. For convenience, the boiling points or melting points of these diamines are shown in the table below wherein Y is substituted by the radicals designated in the generic formula $H_2N$—Y—$NH_2$

| Y | Boiling Point in °C. |
|---|---|
| $(CH_2)_7$ | 220–234/760 mm. |
| $(CH_2)_8$ | 110/10 mm. |
| $(CH_2)_9$ | 124/10 mm. |
| $(CH_2)_{10}$ | 135–143/10 mm. |
| $(CH_2)_{11}$ | 110–116/0.3 mm. |
| $(CH_2)_{12}$ | M.P.=65. |
| —⟨$\phi$⟩— | 85–87/20 mm. |
| —$CH_2$—⟨⟩—$CH_2$— | 141/10 mm. |
| —$CH_2CH_2$—⟨⟩—$CH_2CH_2$— | 115/0.3 mm. |

The new bis-lepidine products are effective parasiticides and are adapted to be employed for the control of pinworms such as *Syphacia obvelata* and tapeworms such as *Hymenolepis nana, Dipylidium caninum* and *Taenia* complete controls of *Syphacia obvelata* and *Hymenolepis nana, Dipylidium caninum* and *Taenia pisiformis*. In representative operations, substantially complete controls of *Syphacia obvelata* and *Hymenolepis nana* have been obtained by oral administration to mice of from 25 to 300 milligrams per kilogram of body weight of N,N'-bis-(2-lepidyl)-1,7-diaminoheptane dihydrochloride.

We claim:
1. A compound selected from the group consisting of bases represented by the formula:

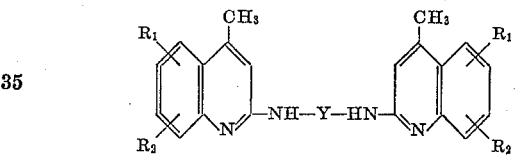

and non-toxic acid-addition and lower alkyl quaternary ammonium salts thereof wherein Y represents a member of the group consisting of alkylene groups having from 2 to 12 carbon atoms inclusive, phenylene, cyclohexyl, 1,4-xylyl and 1,4-phenylenebisethylene and each $R_1$ and $R_2$ represents a member of the group consisting of hydrogen, loweralkyl, loweralkoxy, hydroxy, chloro and bromo.

2. A compound represented by the formula:

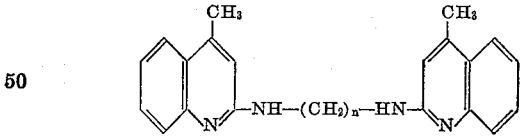

wherein n is an integer from 2 to 12, inclusive.

3. A non-toxic acid-addition salt of a compound as claimed in claim 2.

4. A dihydrochloride salt of a compound as claimed in claim 2.

5. A compound represented by the formula:

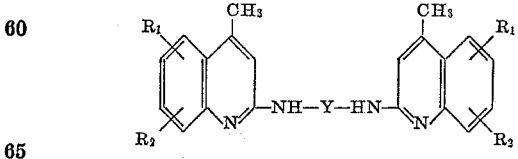

wherein each $R_1$ and $R_2$ represent lower alkyl and Y is phenylene.

6. A compound represented by the formula:

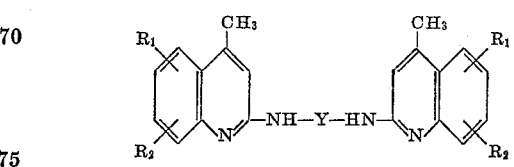

wherein each $R_1$ and $R_2$ represent loweralkoxy and Y is cyclohexyl.

7. A compound represented by the formula:

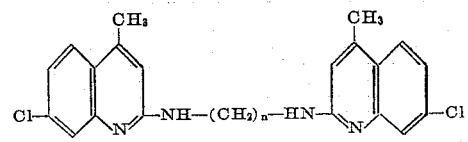

wherein $n$ is an integer from 2 to 12, inclusive.

8. N,N'-bis-(2-lepidyl)-1,6-diaminohexane dihydrochloride.

9. N,N'-bis-(2-lepidyl)-1,7-diaminoheptane dihydrochloride.

10. N,N'-bis-(2-lepidyl)-1,9-diaminononane dihydrochloride.

11. N,N'-bis-(2-lepidyl)-1,11-diaminoundecane dihydrochloride.

12. N,N'-bis-(6-methoxy-2-lepidyl)-1,6-diaminohexane dihydrochloride.

References Cited in the file of this patent
UNITED STATES PATENTS

| | | |
|---|---|---|
| 2,816,893 | Jacob | Dec. 17, 1957 |
| 2,901,484 | Schock | Aug. 25, 1959 |

UNITED STATES PATENT OFFICE
CERTIFICATION OF CORRECTION

Patent No. 3,020,283  February 6, 1962

Richard U. Schock, Jr., et al.

It is hereby certified that error appears in the above numbered patent requiring correction and that the said Letters Patent should read as corrected below.

Column 6, lines 22 and 23, strike out "complete controls of Syphacia obvelata and Hymenolepis nana, Dipylidium caninum and Taenia"; column 6, lines 32 to 38, and lines 59 to 64, the formula, each occurrence, should appear as shown below instead of as in the patent:

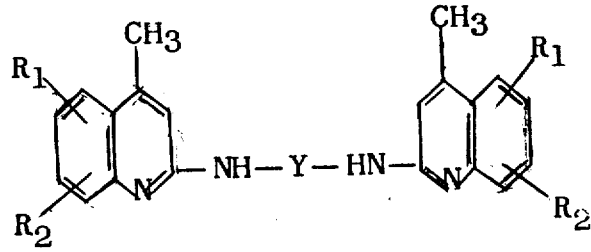

Signed and sealed this 5th day of June 1962.

(SEAL)
Attest:

ERNEST W. SWIDER

Attesting Officer

DAVID L. LADD

Commissioner of Patents